United States Patent
Bauer et al.

(10) Patent No.: US 11,949,285 B2
(45) Date of Patent: Apr. 2, 2024

(54) TRACTION ENGINE FOR A VEHICLE

(71) Applicant: Dr. Ing. h.c. F. Porsche Aktiengesellschaft, Stuttgart (DE)

(72) Inventors: David Bauer, Asperg (DE); Josef Dubsky, Friolzheim (DE); Tobias Engelhardt, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 68 days.

(21) Appl. No.: 17/509,095

(22) Filed: Oct. 25, 2021

(65) Prior Publication Data
US 2022/0140667 A1 May 5, 2022

(30) Foreign Application Priority Data
Oct. 29, 2020 (DE) .................... 10 2020 128 431.4

(51) Int. Cl.
*H02K 21/14* (2006.01)
*H02K 1/16* (2006.01)

(52) U.S. Cl.
CPC ............. *H02K 1/165* (2013.01); *H02K 21/14* (2013.01); *H02K 2213/03* (2013.01)

(58) Field of Classification Search
CPC ........ H02K 1/165; H02K 21/14; H02K 1/278; H02K 1/30; H02K 3/50; H02K 5/225; H02K 3/28; H02K 3/04
See application file for complete search history.

(56) References Cited

U.S. PATENT DOCUMENTS

| | | | |
|---|---|---|---|
| 4,780,635 A | * | 10/1988 | Neumann ............ H02K 17/165 310/179 |
| 9,755,463 B2 | | 9/2017 | Klassen et al. |
| 10,770,956 B2 | * | 9/2020 | Alexander ............. H02K 17/12 |
| 2019/0363601 A1 | | 11/2019 | Kneidl et al. |

FOREIGN PATENT DOCUMENTS

| | | | |
|---|---|---|---|
| CN | 202475050 U | * | 10/2012 |
| DE | 3852658 T2 | | 8/1995 |
| DE | 102018112347 A1 | | 11/2019 |

OTHER PUBLICATIONS

CN-202475050-U machine translation Feb. 25, 2023.*
CN-202475050-U machine translation.*

* cited by examiner

*Primary Examiner* — Leda T Pham
(74) *Attorney, Agent, or Firm* — LEYDIG, VOIT & MAYER, LTD.

(57) ABSTRACT

An electric machine for a vehicle includes: a stator body, the stator body having, in an alternating manner, stator teeth and stator grooves with conductor elements which are arranged therein, and a yoke section with a radially extending yoke height on the stator body radially outside the stator grooves and the stator teeth, the stator body having a stator outer radius. A ratio of the yoke height in relation to the stator outer radius is between 0.20 and 0.28.

10 Claims, 1 Drawing Sheet

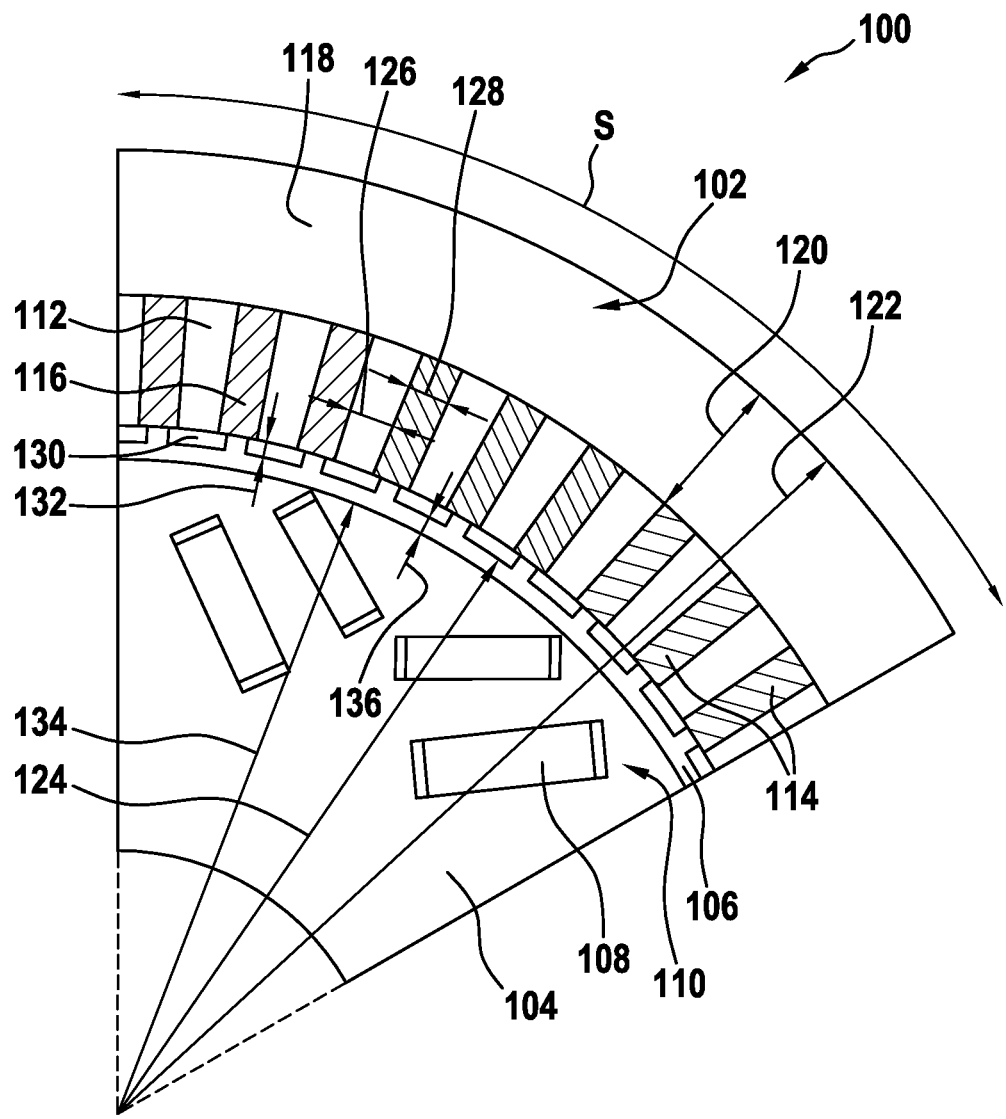

TRACTION ENGINE FOR A VEHICLE

CROSS-REFERENCE TO PRIOR APPLICATION

Priority is claimed to German Patent Application No. DE 10 2020 128 431.4, filed on Oct. 29, 2020, the entire disclosure of which is hereby incorporated by reference herein.

FIELD

The invention relates to an electric machine for a vehicle.

BACKGROUND

U.S. Pat. No. 9,755,463 B2 discloses an electric machine with a first carrier with electromagnetic elements, and with a second carrier with electromagnetic elements, it being possible for the second carrier to move relative to the first carrier. The electric machine has a high current density, but has a complex construction.

DE 10 2018 112 347 A1 discloses an electric machine with a stator and a laminated stator core, conductor elements which are cooled by means of cooling ducts being arranged in the laminated stator core. This benefits high current densities, but there is also an optimization potential here.

SUMMARY

In an embodiment, the present invention provides an electric machine for a vehicle, comprising: a stator body, the stator body having, in an alternating manner, stator teeth and stator grooves with conductor elements which are arranged therein, and a yoke section with a radially extending yoke height on the stator body radially outside the stator grooves and the stator teeth, the stator body having a stator outer radius, wherein a ratio of the yoke height in relation to the stator outer radius is between 0.20 and 0.28.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 diagrammatically shows a partial section through an electric machine.

DETAILED DESCRIPTION

In an embodiment, the present invention provides an electric machine which is improved in contrast with the prior art. It is desirable for an electric machine with a comparatively high current density and an increased efficiency to be provided by way of structurally simple means.

The electric machine serves for a vehicle. The electric machine has a stator body (laminated stator core), the stator body having stator teeth and stator grooves in an alternating manner (along a circumferential direction), in each case one or more conductor elements being arranged in the stator grooves. A yoke section with a radially extending yoke height is configured on the stator body radially outside the stator grooves and the stator teeth. The stator body has a stator outer radius. The ratio v1 of the yoke height in relation to the stator outer radius is between 0.20 and 0.28 (0.20≤ratio v1≤0.28).

The comparatively great yoke height benefits high efficiency of the electric machine, which high efficiency is achieved by way of an increased lamination proportion in the stator and therefore a comparatively high current density. This leads to a reduction of the iron losses and therefore an increased efficiency of the electric machine.

The electric machine is, in particular, a traction motor for a vehicle. The vehicle is, in particular, a motor vehicle which is driven in a partially electric or fully electric manner (electric vehicle). The conductor elements are, in particular, stator windings.

The stator body can preferably have a stator inner radius, the ratio v2 of the stator inner radius in relation to the stator outer radius being between 0.58 and 0.66 (0.58≤ratio v2≤0.66). This therefore results in a comparatively small stator inner radius. This in turn leads to an increased lamination proportion in the stator, which increases the efficiency. As a result of the small stator inner radius, the rotor outer radius can be kept small, which leads to reduced friction losses and therefore to an increased efficiency. The stator outer radius can be kept comparatively small. For example, the stator outer radius can be between 75 mm and 150 mm (millimeters).

Two stator grooves or three stator grooves can preferably be provided or passed through on the stator body per pole and per strand (a stator winding). A plurality of conductor elements can form the strand (a stator winding). In other words, the number of holes (number of stator grooves per pole and strand) is q=2 or q=3. This leads to efficiency advantages and a compact installation space.

The ratio v3 of the stator tooth width to the stator groove width, in particular in the case of two stator grooves per pole and per strand, can preferably be between 0.55 and 0.8 (0.55≤ratio v3≤0.8). As an alternative, the ratio v3 of the stator tooth width to the stator groove width, in particular in the case of three stator grooves per pole and per strand, can be between 1.15 and 1.6 (1.15≤ratio v3≤1.6). As a result, a great stator tooth width can be achieved; in contrast, the stator groove width is comparatively small. In this way, an increased lamination proportion can be achieved which reduces the iron losses. This is accompanied by a high current density. The electric machine is set up, for example by way of adaptation of the ratio v3, in such a way, in particular, that a maximum current density of greater than 40 A/mm2 (amperes/square millimeters) is achieved. The energy consumption can be lowered in large parts of the operating characteristic map, specifically in the range of daily use of a vehicle.

The electric machine can preferably have a pole pair number p of p=3 (three pole pairs, that is to say a total of six poles). In this way, a sufficiently high pole pair number can be achieved in the case of a comparatively compact installation space. The comparatively low frequency of the pole pair number of p=3 affords efficiency advantages, in particular in conjunction with the above-specified geometric ratios.

In each case one tooth tip with a cross section which is enlarged in each case in relation to the stator teeth (or the stator tooth cross section outside the tooth tip) can have at the radially inner end of the stator teeth. This as a rule benefits a higher efficiency and a high current density. The tooth tips can extend in each case radially along a defined tooth tip height.

The electric machine can preferably have a rotor with a rotor outer radius, the rotor outer radius being smaller by a radially oriented air gap height (spacing between the inner face or the stator inner radius of the stator and the outer face or the rotor outer radius of the rotor) than the stator inner radius.

The conductor elements can preferably be cooled directly. Therefore, sufficient cooling is possible even in the case of a high current density. A cooling device can be provided which passes flow around the conductor elements for cooling by means of a cooling medium. A flow of the cooling medium, in particular of oil, around the conductor elements can take place in each case only at the winding head (those sections of the conductor elements which protrude axially out of the stator body) or in each case at the winding head and within the stator groove. Therefore, the cooling device for the provision of cooling medium can be provided in each case at the winding head and/or at the stator groove. As an alternative or in addition, it is conceivable that cooling ducts, in particular water ducts, are configured in each case within the stator groove.

The electric machine can preferably be configured as a permanently excited synchronous machine or as a separately excited synchronous machine.

Further advantageous refinements result from the following description and the drawing, in which:

FIG. 1 diagrammatically shows a segment S or a partial section (cross section) through an electric machine 100.

The electric machine 100 has a stator body 102 and a rotor 104. The stator body 102 surrounds the rotor 104 radially to the outside, the stator body 102 and the rotor 104 being separated from one another by way of an air gap 106. In the example, a plurality of magnets 108 which are optionally equipped with air pockets 110 are arranged in the rotor 104.

The stator body 102 has, in a manner which alternates along a circumferential direction, stator teeth 112 and stator grooves 114 with conductor elements 116 which are arranged therein. A yoke section 118 with a radially extending yoke height 120 is configured on the stator body 102 radially outside the stator grooves 114 and the stator teeth 112, the stator body 102 having a stator outer radius 122. The ratio v1 of the yoke height 120 in relation to the stator outer radius 122 is, in the example, between 0.20 and 0.28 ($0.20 \leq v1 \leq 0.28$).

The stator body 102 has a stator inner radius 124. The ratio v2 of the stator inner radius 124 in relation to the stator outer radius 122 is, in the example, between 0.58 and 0.66 ($0.58 \leq v2 \leq 0.66$).

The stator teeth 112 in each case have a stator tooth width 126. The stator grooves 114 in each case have a stator groove width 128. In the example, the ratio v3 of the stator tooth width 126 to the stator groove width 128 is between 1.15 and 1.6 ($1.15 \leq v3 \leq 1.6$).

In the example, the electric machine 100 has a pole pair number p of p=3 (a total of six poles). In the example, three stator grooves 114 are provided on the stator body 102 per pole and the conductor elements 116 which form a strand or a conductor winding (in FIG. 1, three identically shown stator grooves 114 correspond to a strand). In other words, the number of holes (number of stator grooves 114 per pole and strand) is q=3.

In each case one tooth tip 130 with a cross section which is enlarged in each case in relation to the stator teeth 112 is configured at the radially inner end of the stator teeth 112. The tooth tips 130 extend in each case along a defined tooth tip height 132.

The rotor 104 has a rotor outer radius 134, the rotor outer radius 134 being smaller by a radially oriented height 136 of the air gap 106 (air gap height 136) than the stator inner radius 124.

The conductor elements 116 can be cooled directly, as described above.

The electric machine 100 can be configured as a permanently excited synchronous machine or as a separately excited synchronous machine.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electric machine for a vehicle, comprising:
    a stator body, the stator body having, in an alternating manner, stator teeth and stator grooves with conductor elements which are arranged therein, and a yoke section with a radially extending yoke height on the stator body radially outside the stator grooves and the stator teeth, the stator body having a stator outer radius,
    wherein a ratio of the yoke height in relation to the stator outer radius is between 0.20 and 0.28.

2. The electric machine of claim 1, wherein the stator body has a stator inner radius, and
    wherein a ratio of the stator inner radius to the stator outer radius is between 0.58 and 0.66.

3. The electric machine of claim 1, wherein two or three stator grooves are provided per pole and per strand on the stator body.

4. The electric machine of claim 1, wherein a ratio of a stator tooth width to a stator groove width with two stator grooves per pole and per strand is between 0.55 and 0.8, or
    wherein the ratio of the stator tooth width to the stator groove width with three stator grooves per pole and per strand is between 1.15 and 1.6.

5. The electric machine of claim 1, wherein the electric machine has a pole pair number (p) of p=3.

6. The electric machine of claim 1, wherein each of the stator teeth has a radially inner end, each having one tooth tip with a cross section which is enlarged in relation to the respective stator tooth.

7. The electric machine of claim 2, further comprising:
a rotor with a rotor outer radius, the rotor outer radius being smaller by a radially oriented air gap height than the stator inner radius.

8. The electric machine of claim 1, wherein the conductor elements are cooled directly.

9. The electric machine of claim 1, wherein the electric machine comprises a permanently excited synchronous machine or a separately excited synchronous machine.

10. The electric machine of claim 1, wherein the rotor comprises a plurality of magnets, wherein each magnet of the plurality of magnets is equipped with an air pocket.

* * * * *